(12) United States Patent
Wittkopp et al.

(10) Patent No.: US 8,047,958 B2
(45) Date of Patent: Nov. 1, 2011

(54) MULTI-SPEED TRANSMISSION HAVING TWO PLANETARY GEAR SETS

(75) Inventors: Scott H. Wittkopp, Ypsilanti, MI (US);
Edwin T. Grochowski, Howell, MI (US); James M. Hart, Belleville, MI (US)

(73) Assignee: GM Global Technology Operations LLC, Detroit, MI (US)

( * ) Notice: Subject to any disclaimer, the term of this patent is extended or adjusted under 35 U.S.C. 154(b) by 345 days.

(21) Appl. No.: 12/358,919

(22) Filed: Jan. 23, 2009

(65) Prior Publication Data

US 2010/0190602 A1     Jul. 29, 2010

(51) Int. Cl.
*F16H 3/44*     (2006.01)

(52) U.S. Cl. ........................................... 475/303

(58) Field of Classification Search .................. 475/269, 475/280, 281, 296, 297, 330; 192/103 R–103 FA
See application file for complete search history.

(56) References Cited

U.S. PATENT DOCUMENTS

| | | | |
|---|---|---|---|
| 5,409,428 A | | 4/1995 | Antonov |
| 5,997,429 A | * | 12/1999 | Raghavan et al. ............. 475/280 |
| 6,139,459 A | * | 10/2000 | Suzuki ........................... 475/127 |
| 6,422,371 B1 | * | 7/2002 | Naraki et al. .............. 192/105 C |
| 6,976,933 B2 | * | 12/2005 | Haka ................................ 475/296 |
| 7,115,061 B2 | * | 10/2006 | Tiesler et al. ................. 475/276 |
| 7,137,923 B2 | * | 11/2006 | Tiesler et al. ................. 475/276 |
| 7,815,539 B2 | * | 10/2010 | Ward et al. .................... 475/259 |

* cited by examiner

*Primary Examiner* — David D Le
*Assistant Examiner* — David J Hlavka

(57) ABSTRACT

A transmission is provided having an input member, an output member, two planetary gear sets, a plurality of coupling members and a plurality of torque transmitting devices. Each of the planetary gear sets includes first, second and third members. The torque transmitting devices include clutches, centrifugal clutches, and synchronizers.

13 Claims, 4 Drawing Sheets

| GEAR STATE | GEAR RATIO | RATIO STEP | TORQUE TRANSMITTING ELEMENTS ||||||
|---|---|---|---|---|---|---|---|---|
| | | | 20A | 20B | 30 | 22 | 28 | 24 |
| Rev | -2.000 | | | X | | X | | |
| N | | -0.67 | | | | O | | |
| 1st | 3.000 | | X | | | X | | X |
| 2nd | 1.667 | 1.80 | X | | | | X | X |
| 3rd | 1.000 | 1.67 | X | | X | | X | |

X= ON, CARRYING TORQUE
O= ON, NOT CARRYING TORQUE

FIG. 3

MULTI-SPEED TRANSMISSION HAVING TWO PLANETARY GEAR SETS

FIELD

The invention relates generally to a multiple speed transmission having a plurality of planetary gear sets and a plurality of torque transmitting devices, and more particularly to a transmission having three speeds, two planetary gear sets and a plurality of torque transmitting devices.

BACKGROUND

The statements in this section merely provide background information related to the present disclosure and may or may not constitute prior art.

A typical multiple speed transmission uses a combination of friction clutches, planetary gear arrangements and fixed interconnections to achieve a plurality of gear ratios. The number and physical arrangement of the planetary gear sets, generally, are dictated by packaging, cost and desired speed ratios.

While current transmissions achieve their intended purpose, the need for new and improved transmission configurations which exhibit improved performance, especially from the standpoints of efficiency, responsiveness and smoothness and improved packaging, primarily reduced size and weight, is essentially constant. Accordingly, there is a need for an improved, cost-effective, compact multiple speed transmission.

SUMMARY

A low content transmission is provided having an input member, an output member, two planetary gear sets, a plurality of coupling members and a plurality of torque transmitting devices. Each of the planetary gear sets includes first, second and third members. The torque transmitting devices are for example synchronizers and clutches.

In one embodiment, the transmission includes an input member, an output member, an intermediate member, and first and second planetary gear sets each having first, second and third members, wherein the output member is connected to the second member of the first planetary gear set and the first member of the second planetary gear set. An interconnecting member continuously interconnects the third member of the first planetary gear set with the second member of the second planetary gear set. A first synchronizer is selectively engageable to interconnect the input member with the first member of the first planetary gear set. A second synchronizer is selectively engageable to interconnect the input member with the third member of the second planetary gear set. A first clutch which could be a controllable one-way clutch is selectively engageable to interconnect at least one of the third member of the first planetary gear set and the second member of the second planetary gear set with a stationary member. A second clutch which could be a one-way clutch is engageable to interconnect the third member of the second planetary gear set with the intermediate member. A first centrifugal clutch is selectively engageable to interconnect the intermediate member with the stationary member. A second centrifugal clutch is selectively engageable to interconnect at least one of the output member, the second member of the first planetary gear set, and the first member of the second planetary gear set with the third member of the second planetary gear set. The first and second synchronizers, the first and second clutches, and the first and second centrifugal clutches are engageable in combinations of at least two to establish at least three forward speed ratios and at least one reverse speed ratio between the input member and the output member.

In one aspect of the present invention, the first member of the first planetary gear set and the third member of the second planetary gear set are sun gear members, the second members of the first and second planetary gear sets are carrier members, and the third member of the first planetary gear set and the first member of the second planetary gear set are ring gear members.

In another aspect of the present invention, the first centrifugal clutch includes a first centrifugal clutch flyweight interconnected to the output member and the second centrifugal clutch includes a second centrifugal clutch flyweight interconnected to the output member.

In yet another aspect of the present invention, the reverse speed ratio is provided when the second synchronizer and the first clutch are engaged or activated.

In yet another aspect of the present invention, a first of the at least three forward speed ratios is provided when the first synchronizer, the first clutch, and the second clutch are engaged or activated.

In yet another aspect of the present invention, a second of the at least three forward speed ratios is provided when the first synchronizer, the second clutch, and the first centrifugal clutch are engaged or activated.

In yet another aspect of the present invention, a third of the at least three forward speed ratios is provided when the first synchronizer, the first centrifugal clutch, and the second centrifugal clutch are engaged or activated.

Further objects, aspects and advantages of the present invention will become apparent by reference to the following description and appended drawings wherein like reference numbers refer to the same component, element or feature.

DRAWINGS

The drawings described herein are for illustration purposes only and are not intended to limit the scope of the present disclosure in any way.

FIG. 3 is a truth table presenting the state of engagement of the various torque transmitting mechanisms in each of the available forward and reverse speeds or gear ratios of the transmission illustrated in FIGS. 1 and 2;

DETAILED DESCRIPTION

The following description is merely exemplary in nature and is not intended to limit the present disclosure, application, or uses.

Figure 1:
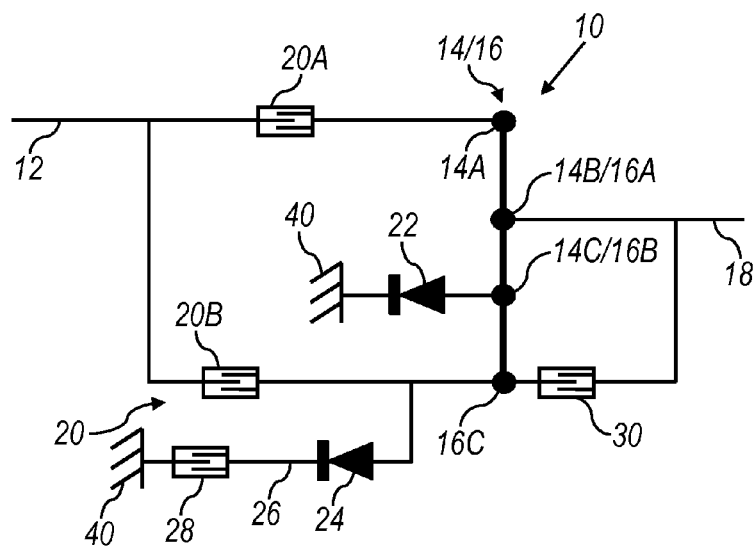
FIG. 1 is a lever diagram of an embodiment of a three speed transmission according to the present invention.

Referring now to FIG. 1, an embodiment of a three speed transmission 10 is illustrated in a lever diagram format. A lever diagram is a schematic representation of the components of a mechanical device such as an automatic transmission. Each individual lever represents a planetary gear set wherein the three basic mechanical components of the planetary gear are each represented by a node. Therefore, a single lever contains three nodes: one for the sun gear, one for the planet gear carrier, and one for the ring gear. The relative length between the nodes of each lever can be used to represent the ring-to-sun ratio of each respective gear set. These lever ratios, in turn, are used to vary the gear ratios of the transmission in order to achieve an appropriate ratios and ratio progression. Mechanical couplings or interconnections between the nodes of the various planetary gear sets are illustrated by thin, horizontal lines and torque transmitting devices such as clutches and brakes are presented as interleaved fingers. Further explanation of the format, purpose and use of lever diagrams can be found in SAE Paper 810102, "The Lever Analogy: A New Tool in Transmission Analysis" by Benford and Leising which is hereby fully incorporated by reference.

The transmission 10 includes an input shaft or member 12, a lever that represents two planetary gear sets including a first planetary gear set 14 and a second planetary gear set 16, and an output shaft or member 18. The first planetary gear set 14 includes three nodes: a first node 14A, a second node 14B, and a third node 14C. The second planetary gear set 16 includes three nodes: a first node 16A, a second node 16B, and a third node 16C. The second node 14B of the first planetary gear set 14 and the first node 16A of the second planetary gear set 16 are represented as a single node, indicated by reference designation 14B/16A in FIG. 1 and the third node 14C of the first planetary gear set 14 and the second node 16B of the second planetary gear set 16 are represented by a single node, indicated by reference designation 14C/16B in FIG. 1.

The transmission 10 further includes a synchronizer assembly 20 that includes a first synchronizer or dog clutch 20A and a second synchronizer or dog clutch 20B. The first synchronizer or dog clutch 20A selectively connects the input member 12 with the first node 14A of the first planetary gear set 14. The second synchronizer or dog clutch 20B selectively connects the input member 12 with the third node 16C of the second planetary gear set 16. A first clutch 22 selectively connects the third node 14C of the first planetary gear set 14 and the second node 16B of the second planetary gear set 16 with a ground, stationary member, or a transmission housing 40. A second clutch 24 connects the third node 16C of the second planetary gear set 16 with an intermediate shaft or member 26. A first centrifugal clutch 28 selectively connects the intermediate shaft or member 26 with the ground, the stationary member, or the transmission housing 40. A second centrifugal clutch 30 selectively connects the third node 16C of the second planetary gear set 16 with the second node 14B of the first planetary gear set 14, the first node 16A of the second planetary gear set 16, and the output shaft or member 18.

Figure 2:
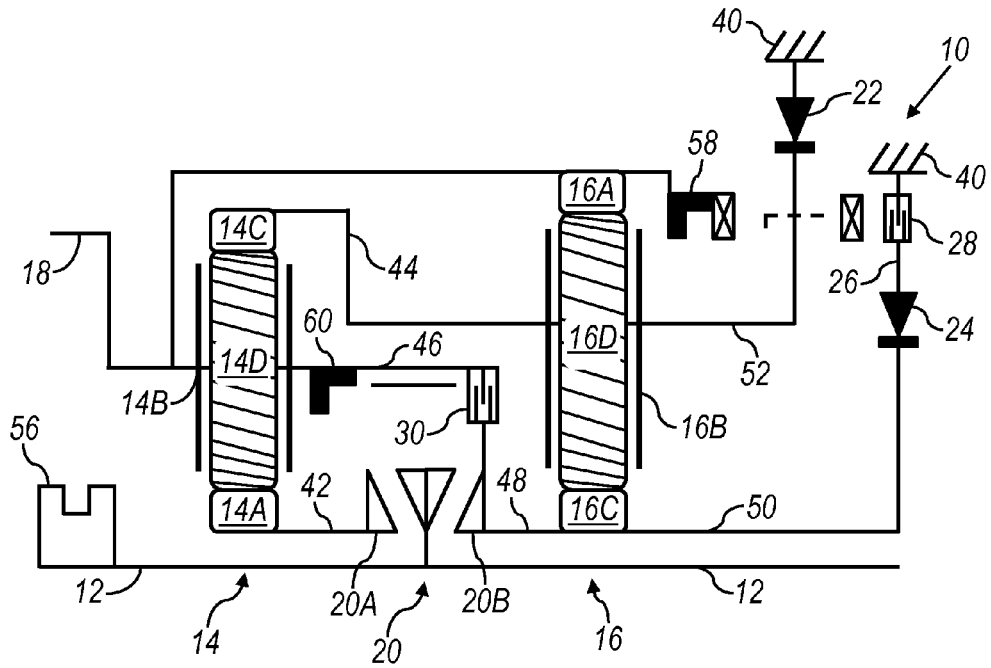
FIG. 2 is a diagrammatic view of an embodiment of a three speed transmission according to the present invention.

Referring now to FIG. 2, a stick diagram presents a schematic layout of the embodiment of the three speed transmission 10 according to the present invention. In FIG. 2, the numbering from the lever diagram of FIG. 1 is carried over. The synchronizers, clutches, centrifugal clutches, and intermediate member are correspondingly presented whereas the nodes of the planetary gear sets now appear as components of planetary gear sets such as sun gears, ring gears, planet gears and planet gear carriers.

For example, the planetary gear set 14 includes a sun gear member 14A, a ring gear member 14C and a planet gear carrier member 14B that rotatably supports a set of planet gears 14D (only one of which is shown). The sun gear member 14A is connected for common rotation with a first shaft or interconnecting member 42. The ring gear member 14C is connected for common rotation with a second shaft or interconnecting member 44. The planet carrier member 14B is connected for common rotation with the output member 18 and a third shaft or interconnecting member 46. The planet gears 14D each are configured to intermesh with both the sun gear member 14A and the ring gear member 14C.

The planetary gear set 16 includes a sun gear member 16C, a ring gear member 16A and a planet gear carrier member 16B that rotatably supports a set of planet gears 16D (only one of which is shown). The sun gear member 16C is connected for common rotation with a fourth shaft or interconnecting member 48 and a fifth shaft or interconnecting member 50. The ring gear member 16A is connected for common rotation with the output shaft or member 18. The planet carrier member 16B is connected for common rotation with the third shaft or interconnecting member 44 and with a sixth shaft or interconnecting member 52. The planet gears 16D each are configured to intermesh with both the sun gear member 16C and the ring gear member 16A.

The input shaft or member 12 is continuously connected to an engine (not shown) or to a turbine of a torque converter (not shown). The output shaft or member 18 is continuously connected with the final drive unit or transfer case (not shown).

The various torque transmitting mechanisms including the synchronizer assembly 20, the clutches 22, 24, and the centrifugal clutches 28, 30 allow for selective interconnection of the shafts or interconnecting members, members of the planetary gear sets and the housing. For example, the synchronizer assembly 20 includes a collar 56 that is operable to translate an actuator or shift fork between left and right positions, thereby actuating the first synchronizer 20A and the second synchronizer 20B. The first synchronizer 20A is engageable to connect the first shaft or interconnecting member 42 with the input shaft or member 12. The second synchronizer 20B is engageable to connect the fourth shaft or interconnecting member 48 with the input shaft or member 12.

The first clutch 22 could be a typical brake clutch or a controllable one-way clutch. The controllable one-way clutch would be required to hold torque in both directions in one state and to hold torque in one direction and overrun in the other direction for the other state. The second clutch 24 could be a conventional one-way clutch that transmits torque in one rotational direction only. The first clutch 22 is engageable to connect the sixth shaft or interconnecting member 52 with the ground, stationary member, or transmission housing 40 in order to restrict the movement of the sixth interconnecting member 52 relative to the transmission housing. The second clutch 24 is engageable to connect the fifth shaft or interconnecting member 50 with the intermediate member 26 when the fifth shaft or interconnecting member 50 rotates in a direction that engages the second clutch 24.

Figure 4:
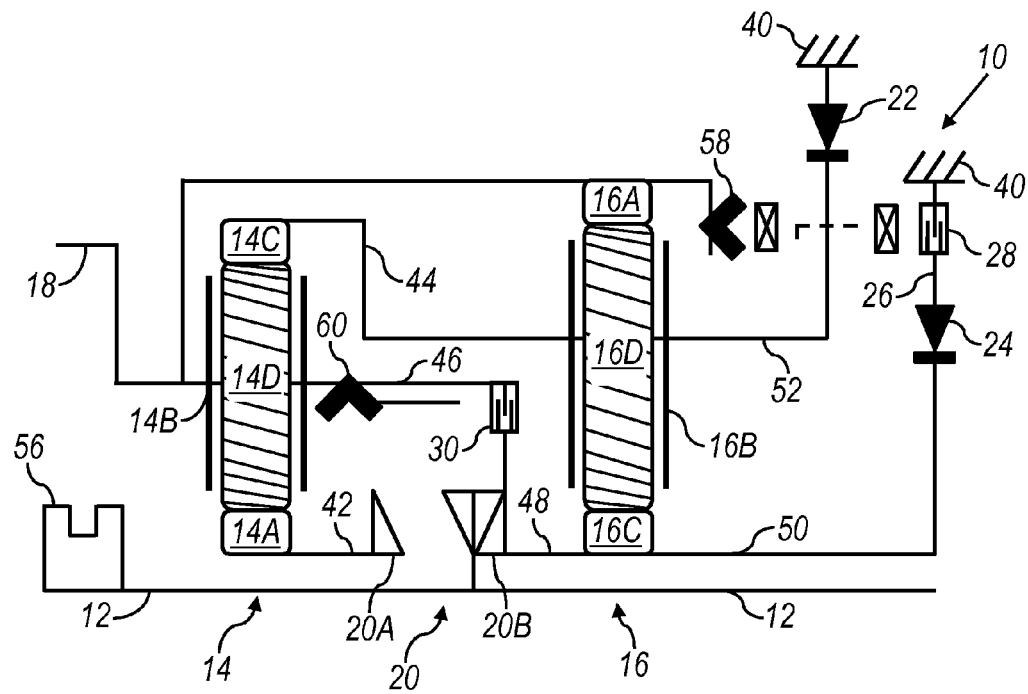
FIG. 4 is a diagrammatic view of an embodiment of the three speed transmission according to the present invention in a reverse gear ratio.
Figure 5:
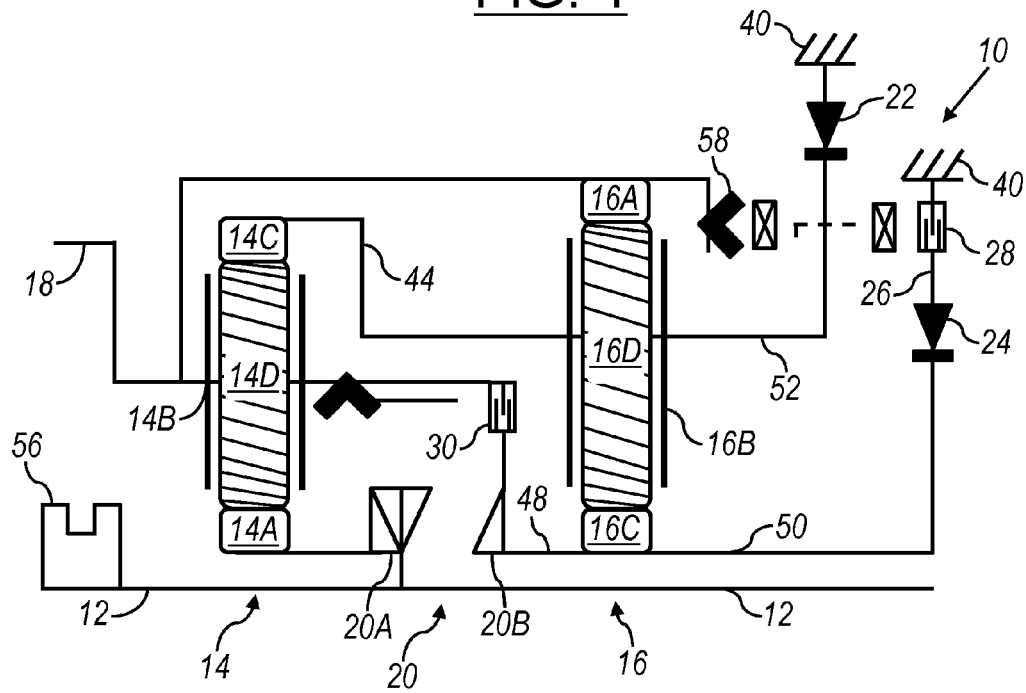
FIG. 5 is a diagrammatic view of an embodiment of the three speed transmission according to the present invention in a first gear ratio.
Figure 6:
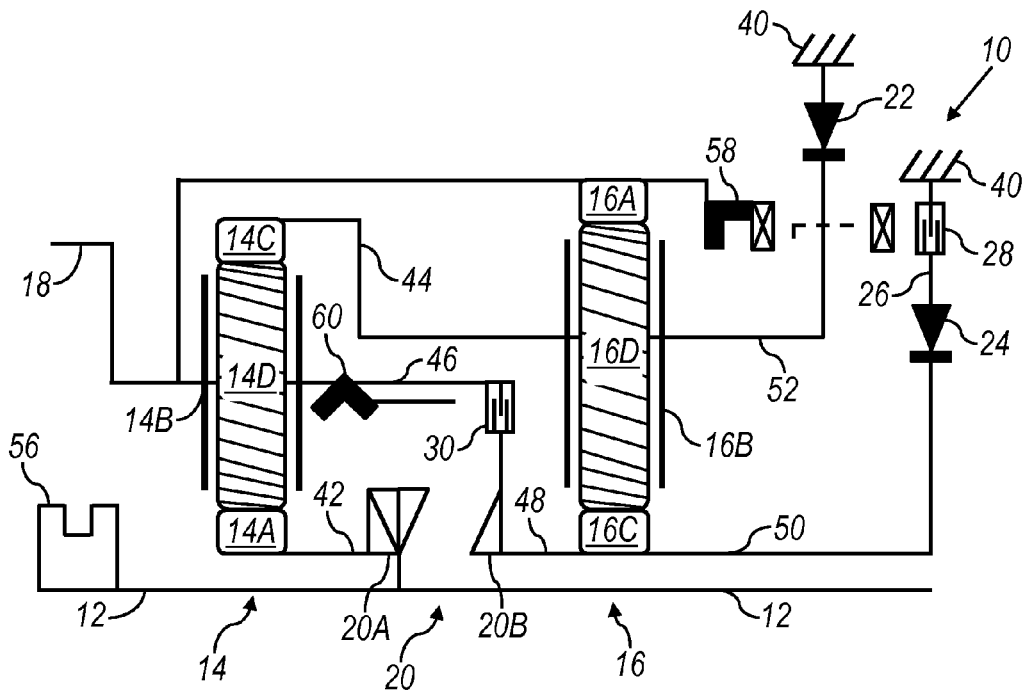
FIG. 6 is a diagrammatic view of an embodiment of the three speed transmission according to the present invention in a second gear ratio.
Figure 7:
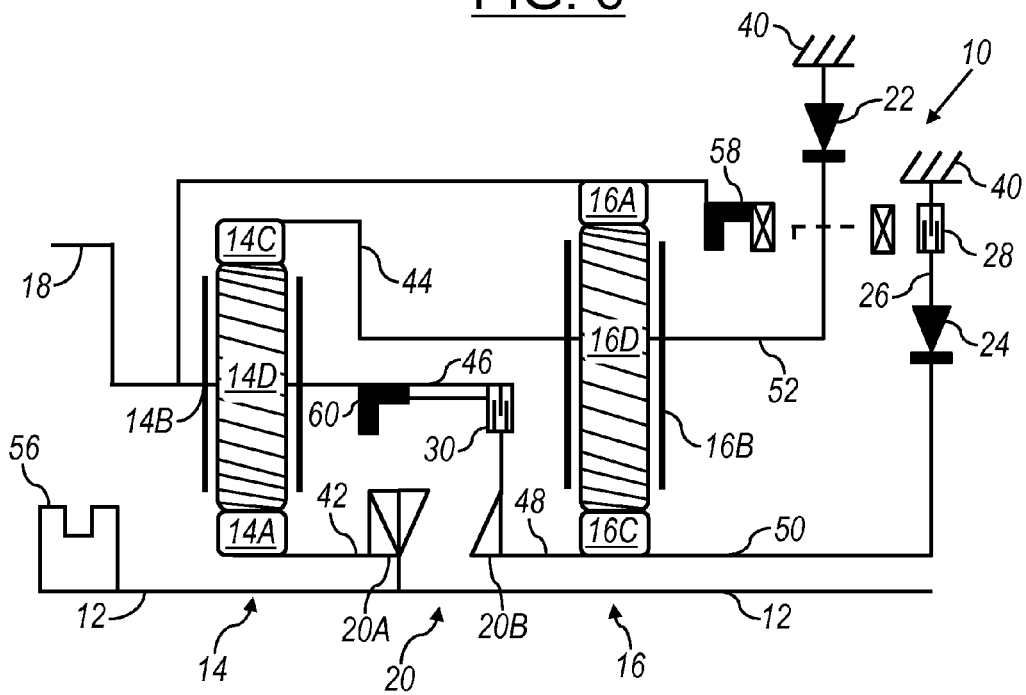
FIG. 7 is a diagrammatic view of an embodiment of the three speed transmission according to the present invention in a third gear ratio.

The centrifugal clutches 28, 30 use centrifugal force to compel weighted arms or flyweights to swing outward and force the clutch to engage. The clutches are disengaged using gear thrust. More specifically, the first centrifugal clutch 28 includes a flyweight 58 that is rotationally coupled to the output shaft or member 18. When in a released condition, as illustrated in FIGS. 4 and 5, the flyweight 58 does not engage the first centrifugal clutch 28. When the output member 18 and therefore the flyweight 58 reach a predetermined rotational speed, the flyweight 58 pivots or otherwise moves and engages the first centrifugal clutch 28, as illustrated in FIGS. 2, 6 and 7. When engaged, the first centrifugal clutch 28 connects the intermediate member 26 to the ground, stationary member, or transmission housing 40 in order to restrict the movement of the intermediate member 26 relative to the transmission housing 40. A spring, not shown, disengages the first centrifugal clutch 28 when the rotational speed of the output member 18 decreases such that the flyweight 58 returns to the rest position. The second centrifugal clutch 30 includes a flyweight 60 that is rotationally coupled to the output shaft or member 18. When in a released condition, as illustrated in FIGS. 4-6, the flyweight 60 does not engage the first centrifugal clutch 30. When the output member 18 and therefore the flyweight 60 reach a predetermined rotational speed that is larger than the rotational speed required to move the flyweight 58, the flyweight 60 pivots or otherwise moves and engages the second centrifugal clutch 30, as illustrated in FIGS. 2 and 7. When engaged, the second centrifugal clutch 30 connects the third shaft or interconnecting member 46 with the fourth shaft or interconnecting member 48. A spring, not shown, disengages the second centrifugal clutch 30 when the rotational speed of the output member 18 decreases such that the flyweight 60 returns to the rest position.

Referring now to FIGS. 3-7, the operation of the embodiment of the three speed transmission 10 will be described. It will be appreciated that transmission 10 is capable of transmitting torque from the input shaft or member 12 to the output shaft or member 18 in at least three forward speed or torque ratios and at least one reverse speed or torque ratio. Each forward and reverse speed or torque ratio is attained by engagement of one or more of the torque-transmitting mechanisms (i.e. first synchronizer 20A, second synchronizer 20B, first clutch 22, second clutch 24, first centrifugal clutch 28, and second centrifugal clutch 30), as will be explained below. FIG. 3 is a truth table presenting the various combinations of torque-transmitting mechanisms that are activated or engaged to achieve the various gear states. An "X" in the box means that the particular synchronizer or clutch is engaged to achieve the desired gear state. An "O" represents that the particular torque transmitting mechanism is on or active, but not carrying torque. Actual numerical gear ratios of the various gear states are also presented although it should be appreciated that these numerical values are exemplary only and that they may be adjusted over significant ranges to accommodate various applications and operational criteria of the transmission 10. An example of the gear ratios that may be obtained using the embodiments of the present invention are also shown in FIG. 3. Of course, other gear ratios are achievable depending on the gear diameter, gear teeth count and gear configuration selected.

With reference to FIG. 3 and FIG. 4, to establish a reverse gear, the second synchronizer 20B and the first clutch 22 are engaged or activated. The second synchronizer 20B connects the fourth shaft or interconnecting member 48 with the input shaft or member 12. The first clutch 22 connects the sixth shaft or interconnecting member 52 with the ground, stationary member, or transmission housing 40 in order to restrict the movement of the sixth interconnecting member 52 relative to the transmission housing 40.

With reference to FIG. 3 and FIG. 5, to establish a first gear, the first synchronizer 20A, the first clutch 22, and the second clutch 24 are engaged or activated. The first synchronizer 20A connects the first shaft or interconnecting member 42 with the input shaft or member 12. The first clutch 22 connects the sixth shaft or interconnecting member 52 with the ground, stationary member, or transmission housing 40 in order to restrict the movement of the sixth interconnecting member 52 relative to the transmission housing 40. The second clutch 24 connects the fifth shaft or interconnecting member 50 with the intermediate member 26. However, since the second centrifugal clutch 28 is not engaged or activated, the intermediate member 26 is not coupled to ground.

With reference to FIG. 3 and FIG. 6, to establish a second gear, the first synchronizer 20A, the second clutch 24, and the first centrifugal clutch 28 are engaged or activated. The first synchronizer 20A connects the first shaft or interconnecting member 42 with the input shaft or member 12. The second clutch 24 connects the fifth shaft or interconnecting member 50 with the intermediate member 26. Sufficient rotation of the output member 18 pivots or moves the flyweight 58 thereby engaging the first centrifugal clutch 28. When engaged, the first centrifugal clutch 28 connects the intermediate member 26 to the ground, stationary member, or transmission housing 40 in order to restrict the movement of the intermediate member 26 relative to the transmission housing 40.

With reference to FIG. 3 and FIG. 7, to establish a third gear, the first synchronizer 20A, the first centrifugal clutch 28, and the second centrifugal clutch 30 are engaged or activated. The first synchronizer 20A connects the first shaft or interconnecting member 42 with the input shaft or member 12. Sufficient rotation of the output member 18 pivots or moves the flyweight 58 thereby engaging the first centrifugal clutch 28. When engaged, the first centrifugal clutch 28 connects the intermediate member 26 to the ground, stationary member, or transmission housing 40 in order to restrict the movement of the intermediate member 26 relative to the transmission housing 40. However, the second clutch 24 is overrunning and not connecting the intermediate member 26 to the sun gear 16C of the second planetary gear set. Sufficient rotation of the output member 18 pivots or moves the flyweight 60 thereby engaging the second centrifugal clutch 30. When engaged, the second centrifugal clutch 30 connects the third shaft or interconnecting member 46 with the fourth shaft or interconnecting member 48.

It will be appreciated that the foregoing explanation of operation and gear states of the eight speed transmission 10 assumes, first of all, that all the synchronizers and clutches not specifically referenced in a given gear state are inactive or disengaged and, second of all, that during gear shifts, i.e., changes of gear state, between at least adjacent gear states, a synchronizer or clutch engaged or activated in both gear states will remain engaged or activated.

The description of the invention is merely exemplary in nature and variations that do not depart from the gist of the invention are intended to be within the scope of the invention. Such variations are not to be regarded as a departure from the spirit and scope of the invention.

We claim the following:

1. A transmission comprising:
    an input member;
    an output member;
    an intermediate member;
    first and second planetary gear sets each having first, second and third members, wherein the output member is continuously interconnected to each of the second member of the first planetary gear set and the first member of the second planetary gear set;
    an interconnecting member continuously interconnecting the third member of the first planetary gear set with the second member of the second planetary gear set;
    a first synchronizer selectively engageable to interconnect the input member with the first member of the first planetary gear set;

a second synchronizer selectively engageable to interconnect the input member with the third member of the second planetary gear set;

a first clutch selectively engageable to interconnect at least one of the third member of the first planetary gear set and the second member of the second planetary gear set with a stationary member;

a second clutch selectively engageable to interconnect the third member of the second planetary gear set with the intermediate member;

a first centrifugal clutch selectively engageable to interconnect the intermediate member with the stationary member; and a second centrifugal clutch selectively engageable to interconnect at least one of the output member, the second member of the first planetary gear set, and the first member of the second planetary gear set with the third member of the second planetary gear set, and wherein the first and second synchronizers, the first and second clutches, and the first and second centrifugal clutches are engageable in combinations of at least two to establish at least three forward speed ratios and at least one reverse speed ratio between the input member and the output member.

2. The transmission of claim 1 wherein the first member of the first planetary gear set and the third member of the second planetary gear set are sun gear members, the second members of the first and second planetary gear sets are carrier members, and the third member of the first planetary gear set and the first member of the second planetary gear set are ring gear members.

3. The transmission of claim 1 wherein the first centrifugal clutch includes a first centrifugal clutch flyweight interconnected to the output member and the second centrifugal clutch includes a second centrifugal clutch flyweight interconnected to the output member.

4. The transmission of claim 1 wherein the reverse speed ratio is provided when the second synchronizer and the first clutch are engaged or activated.

5. The transmission of claim 4 wherein a first of the at least three forward speed ratios is provided when the first synchronizer, the first clutch, and the second clutch are engaged or activated.

6. The transmission of claim 5 wherein a second of the at least three forward speed ratios is provided when the first synchronizer, the second clutch, and the first centrifugal clutch are engaged or activated.

7. The transmission of claim 6 wherein a third of the at least three forward speed ratios is provided when the first synchronizer, the first centrifugal clutch, and the second centrifugal clutch are engaged or activated.

8. A transmission comprising:
an input member;
an output member;
an intermediate member;
first and second planetary gear sets each having a sun gear member, a carrier member, and a ring gear member, wherein the output member is continuously interconnected to each of the carrier member of the first planetary gear set and the ring gear member of the second planetary gear set;

an interconnecting member continuously interconnecting the ring gear member of the first planetary gear set with the carrier member of the second planetary gear set;

a first synchronizer selectively engageable to interconnect the input member with the sun gear member of the first planetary gear set;

a second synchronizer selectively engageable to interconnect the input member with the sun gear member of the second planetary gear set;

a first one-way clutch selectively engageable to interconnect at least one of the ring gear member of the first planetary gear set and the carrier member of the second planetary gear set with a stationary member;

a second one-way clutch selectively engageable to interconnect the sun gear member of the second planetary gear set with the intermediate member;

a first centrifugal clutch selectively engageable to interconnect the intermediate member with the stationary member; and a second centrifugal clutch selectively engageable to interconnect at least one of the output member, the carrier member of the first planetary gear set, and the ring gear member of the second planetary gear set with the sun gear member of the second planetary gear set, and wherein the first and second synchronizers, the first and second one-way clutches, and the first and second centrifugal clutches are engageable in combinations of at least two to establish at least three forward speed ratios and at least one reverse speed ratio between the input member and the output member.

9. The transmission of claim 1 wherein the first centrifugal clutch includes a first centrifugal clutch flyweight interconnected to the output member and the second centrifugal clutch includes a second centrifugal clutch flyweight interconnected to the output member.

10. The transmission of claim 8 wherein the reverse speed ratio is provided when the second synchronizer and the first clutch are engaged or activated.

11. The transmission of claim 10 wherein a first of the at least three forward speed ratios is provided when the first synchronizer, the first clutch, and the second clutch are engaged or activated.

12. The transmission of claim 11 wherein a second of the at least three forward speed ratios is provided when the first synchronizer, the second clutch, and the first centrifugal clutch are engaged or activated.

13. The transmission of claim 12 wherein a third of the at least three forward speed ratios is provided when the first synchronizer, the first centrifugal clutch, and the second centrifugal clutch are engaged or activated.

* * * * *